United States Patent [19]

Clegg

[11] Patent Number: 4,616,905
[45] Date of Patent: Oct. 14, 1986

[54] LOUVERED CONVERGENT CONICAL LENS

[76] Inventor: John E. Clegg, 2320 Keystone Dr., Orlando, Fla. 32806

[21] Appl. No.: 642,241

[22] Filed: Aug. 20, 1984

[51] Int. Cl.$^4$ .................................................. G02B 3/02
[52] U.S. Cl. ................................................... 350/432
[58] Field of Search ............................ 350/432, 276 R

[56] References Cited

U.S. PATENT DOCUMENTS

| | | | |
|---|---|---|---|
| 2,003,070 | 5/1935 | Ylla-Conte | 350/432 |
| 2,881,654 | 4/1959 | Toffolo. | |
| 2,882,784 | 4/1959 | Toffolo. | |
| 4,082,433 | 4/1978 | Appledorn et al. | 350/276 R |
| 4,277,148 | 7/1981 | Clegg. | |
| 4,325,612 | 4/1982 | Clegg. | |
| 4,333,713 | 6/1982 | Clegg. | |
| 4,494,529 | 1/1985 | Lew | 126/441 |

*Primary Examiner*—John K. Corbin
*Assistant Examiner*—Rebecca D. Gass

[57] ABSTRACT

A convex conical-concave conical lens with louvers for the reception of convergent conical beams and the interception of nonconvergent conical beams, for use in convergent conical beam concentrators which receive incipient beams of diffused sunlight.

1 Claim, 4 Drawing Figures

LOUVERED CONVERGENT CONICAL LENS

BACKGROUND

The code designation of the lens is RT:C (R—refracting section (face) of a lens, T—transmitting section of a lens, and C—concentrating lens).

Prior art includes the following patents:

1. Biconical Refractor, U.S. Pat. No. 2,881,654, Apr. 14, 1959, D. S. Toffolo. This is a beam concentrator with an upper component lens which receives an annular incipient beam.

2. Conical Refractor, U.S. Pat. No. 2,882,784, Apr. 21, 1959, D. S. Toffolo. This is a beam concentrator with a convex conical section which is parallel to a concave conical section.

3. Reflective Beam Concentrator, U.S. Pat. No. 4,325,612, Apr. 20, 1982, John E. Clegg. This concentrator has a lens with a convex conical section which receives a convergent conical beam and with a concave conical section which emits a concentrated whole beam.

DRAWINGS

DESCRIPTION

Figure 1:
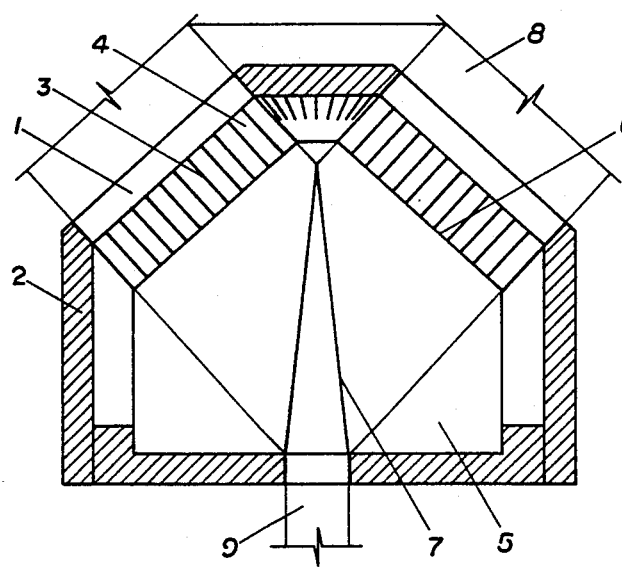
FIG. 1 is an elevation of the louvered convergent conical lens with a ray diagram.
Figure 2:
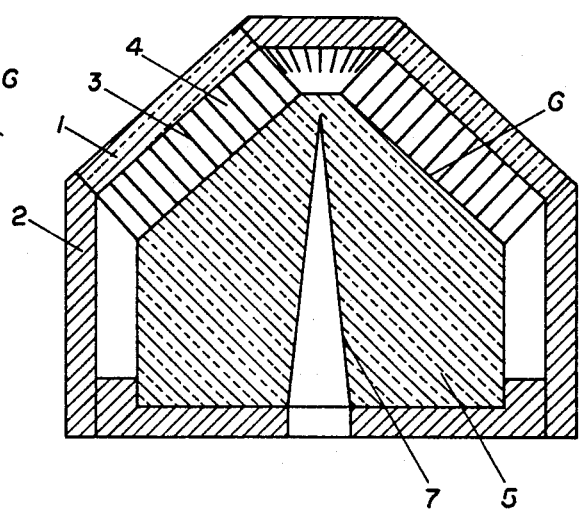
FIG. 2 is an elevation of the louvered convergent conical lens with the lens and cover glass shown in section.

FIG. 1 shows the louvered conical lens with conical cover glass 1 mounted in casing 2, a series of thirteen conical louvers 3 with parallel walls and graduated diameters, a series of twenty four radial fin louvers 4 and conical lens RT 5 with a convex conical section 6 and a concave conical section 7. Conical louvers 3 and radial fin louvers 4 are perpendicular to convex conical section 6 so as to admit a convergent conical incipient beam 8 of diffused sunlight.

Incipient beam 8 is transmitted by convex conical section 6 and refracted and emitted by concave conical section 7, forming concentrated circular whole beam 9 which is emitted parallel to the vertical axis of the lens.

Figure 4:
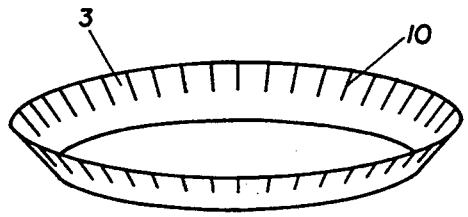
FIG. 4 is a perspective view of a conical louver.
Figure 3:
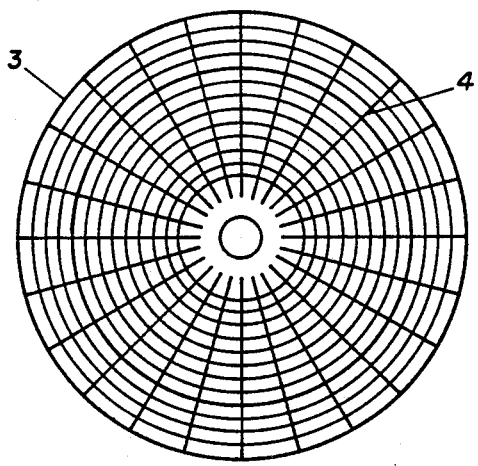
FIG. 3 is a top view of the louvers.

FIG. 3 shows twenty four radial fin louvers 4 disposed at angles of 15° around the axis of the lens and meshed with conical louvers 3 by means of conical louver slots 10 and radial fin louver slots (not shown) as shown in FIG. 4.

The purpose of the louvers is to intercept nonconvergent conical radiation and thereby reduce interference in the concentrated beam.

I claim:

1. A louvered convergent conical lens comprising in general conical louvers mounted on the convex conical section of a conical lens as means of admitting a diffused incipient convergent conical beam of sunlight to the lens section and intercepting non-convergent sunlight, and comprising in particular;

conical lens RT (5) having a convex conical section (6) which receives and transmits said convergent conical incipient beam (8) of diffused sunlight, and having a concave conical section (7) which refracts said incipient beam (8), forming a concentrated circular whole beam (9) which is emitted parallel to the vertical optic axis of the lens, said conical louvers (3) comprising a series of thirteen conical louvers with parallel walls and graduated diameters, mounted adjacent to and perpendicular to the convex conical section (6) of conical lens RT (5), each conical louver (3) having twenty-four slots (10) occupying radial planes separated by angles of 15°, and radial fin louvers (4) comprising twenty-four fins occupying radial planes separated by angles of 15° and meshed with the slots (10) of conical louvers (3), and conical glass cover (1) mounted outside and adjacent to conical louvers (3) and radial fin louvers (4).

* * * * *